US011056149B2

(12) United States Patent
Yamada

(10) Patent No.: US 11,056,149 B2
(45) Date of Patent: Jul. 6, 2021

(54) MEDICAL IMAGE STORAGE AND REPRODUCTION APPARATUS, METHOD, AND PROGRAM

(71) Applicant: FUJIFILM Corporation, Tokyo (JP)

(72) Inventor: Kenta Yamada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 86 days.

(21) Appl. No.: 15/716,003

(22) Filed: Sep. 26, 2017

(65) Prior Publication Data

US 2018/0090176 A1 Mar. 29, 2018

(30) Foreign Application Priority Data

Sep. 28, 2016 (JP) ............................ JP2016-189796

(51) Int. Cl.
*H04N 13/00* (2018.01)
*A61B 1/04* (2006.01)
(Continued)

(52) U.S. Cl.
CPC ........ *G11B 27/102* (2013.01); *G06K 9/00744* (2013.01); *G06K 9/00765* (2013.01); *G06T 7/0014* (2013.01); *G06T 7/70* (2017.01); *G06T 15/08* (2013.01); *G06T 19/00* (2013.01); *H04N 5/76* (2013.01); *H04N 5/91* (2013.01); *H04N 9/8205* (2013.01); *H04N 9/8715* (2013.01);
(Continued)

(58) Field of Classification Search
USPC .................................. 386/223, 248; 348/45
See application file for complete search history.

(56) References Cited

U.S. PATENT DOCUMENTS 8,382,662 B2 * 2/2013 Soper .................. A61B 1/0008 385/115
10,025,479 B2 * 7/2018 Zhao .................... G06F 19/321
(Continued)

FOREIGN PATENT DOCUMENTS

JP 2004-180940 A 7/2004
JP 2005-131319 A 5/2005
(Continued)

OTHER PUBLICATIONS

Japanese Office Action for corresponding Japanese Application No. 2016-189796, dated May 14, 2019, with English translation.

*Primary Examiner* — Nigar Chowdhury
(74) *Attorney, Agent, or Firm* — Birch, Stewart, Kolasch & Birch, LLP

(57) ABSTRACT

The medical image storage and reproduction apparatus includes: a storage unit that stores a motion picture obtained by imaging an imaging target; a virtual image generation unit that generates a virtual image based on a three-dimensional medical image captured in advance; a chapter information assignment unit that detects an anatomical feature or a functional feature from the virtual image corresponding to an updated frame according to updating of each frame of the motion picture and assigns chapter information to the motion picture based on the detection point in time; and a display control unit that displays a selection screen for receiving the selection of chapter information. The display control unit reproduces the motion picture based on the selected chapter information.

15 Claims, 9 Drawing Sheets

G S1 60 1 2 S2

(51) Int. Cl.

| | |
|---|---|
| ***H04N 9/80*** | (2006.01) |
| ***G11B 27/10*** | (2006.01) |
| ***H04N 5/91*** | (2006.01) |
| ***G06T 19/00*** | (2011.01) |
| ***G06T 7/00*** | (2017.01) |
| ***H04N 5/76*** | (2006.01) |
| ***H04N 9/82*** | (2006.01) |
| ***G06T 7/70*** | (2017.01) |
| ***G06K 9/00*** | (2006.01) |
| ***G06T 15/08*** | (2011.01) |
| ***H04N 9/87*** | (2006.01) |

(52) U.S. Cl.

CPC .................. *G06K 2209/051* (2013.01); *G06T 2207/10068* (2013.01); *G06T 2207/10081* (2013.01); *G06T 2207/10088* (2013.01); *G06T 2207/30061* (2013.01); *G06T 2210/41* (2013.01); *G06T 2215/16* (2013.01); *G06T 2219/028* (2013.01)

(56) References Cited

U.S. PATENT DOCUMENTS 10,278,674 B2 * 5/2019 Oh .......................... G06T 15/08
10,617,401 B2 * 4/2020 Mihailescu ............ A61B 34/20
10,674,936 B2 * 6/2020 Averbuch ............... A61B 5/066
10,799,302 B2 * 10/2020 Atarot .................. A61B 5/7425
2005/0020878 A1 * 1/2005 Ohnishi ............. A61B 1/00009 600/117
2005/0182295 A1 * 8/2005 Soper ................... A61B 1/0008 600/117
2005/0261550 A1 * 11/2005 Akimoto ............ A61B 1/00009 600/117
2007/0225574 A1 9/2007 Ueda
2012/0287238 A1 * 11/2012 Onishi ................. A61B 1/0005 348/45
2012/0299818 A1 * 11/2012 Li ......................... G06F 3/0484 345/156
2013/0108126 A1 * 5/2013 Leighow ................ G16H 30/20 382/128
2013/0155216 A1 6/2013 Kasumi
2013/0342668 A1 * 12/2013 Kasumi .................. H04N 5/772 348/74
2014/0038152 A1 * 2/2014 Micieli ............... G06F 19/3418 434/267
2014/0043455 A1 * 2/2014 Fukuda ................ A61B 1/0005 348/74
2014/0369578 A1 * 12/2014 Itai ........................ A61B 6/032 382/128
2015/0138329 A1 * 5/2015 Braun .................. A61B 5/6861 348/71
2015/0150537 A1 * 6/2015 Maruyama ........... A61B 8/0825 600/407
2015/0196228 A1 * 7/2015 Akimoto ............ A61B 1/00147 600/109
2015/0257847 A1 * 9/2015 Higgins ................ G06T 19/003 600/429
2015/0272423 A1 * 10/2015 Ito ...................... A61B 1/00009 600/476
2015/0313445 A1 * 11/2015 Davidson ............. G06T 3/4038 600/109
2015/0356756 A1 * 12/2015 Okamoto ............... A61B 6/032 382/131
2016/0000517 A1 * 1/2016 Kehat .................... A61B 34/25 600/424
2016/0070436 A1 * 3/2016 Thomas ................. A61B 5/055 715/771
2016/0078174 A1 * 3/2016 Chung ................... G06Q 50/24 705/3

FOREIGN PATENT DOCUMENTS

| | | | |
|---|---|---|---|
| JP | 2005-267033 | A | 9/2005 |
| JP | 2006-181110 | A | 7/2006 |
| JP | 2011-36371 | A | 2/2011 |
| JP | 2011-36372 | A | 2/2011 |
| JP | 2014-33931 | A | 2/2014 |
| JP | 2016-7444 | A | 1/2016 |
| JP | 2016-42982 | A | 4/2016 |
| WO | WO 2006/001055 | A1 | 1/2006 |
| WO | WO 2012/165381 | A1 | 12/2012 |

* cited by examiner

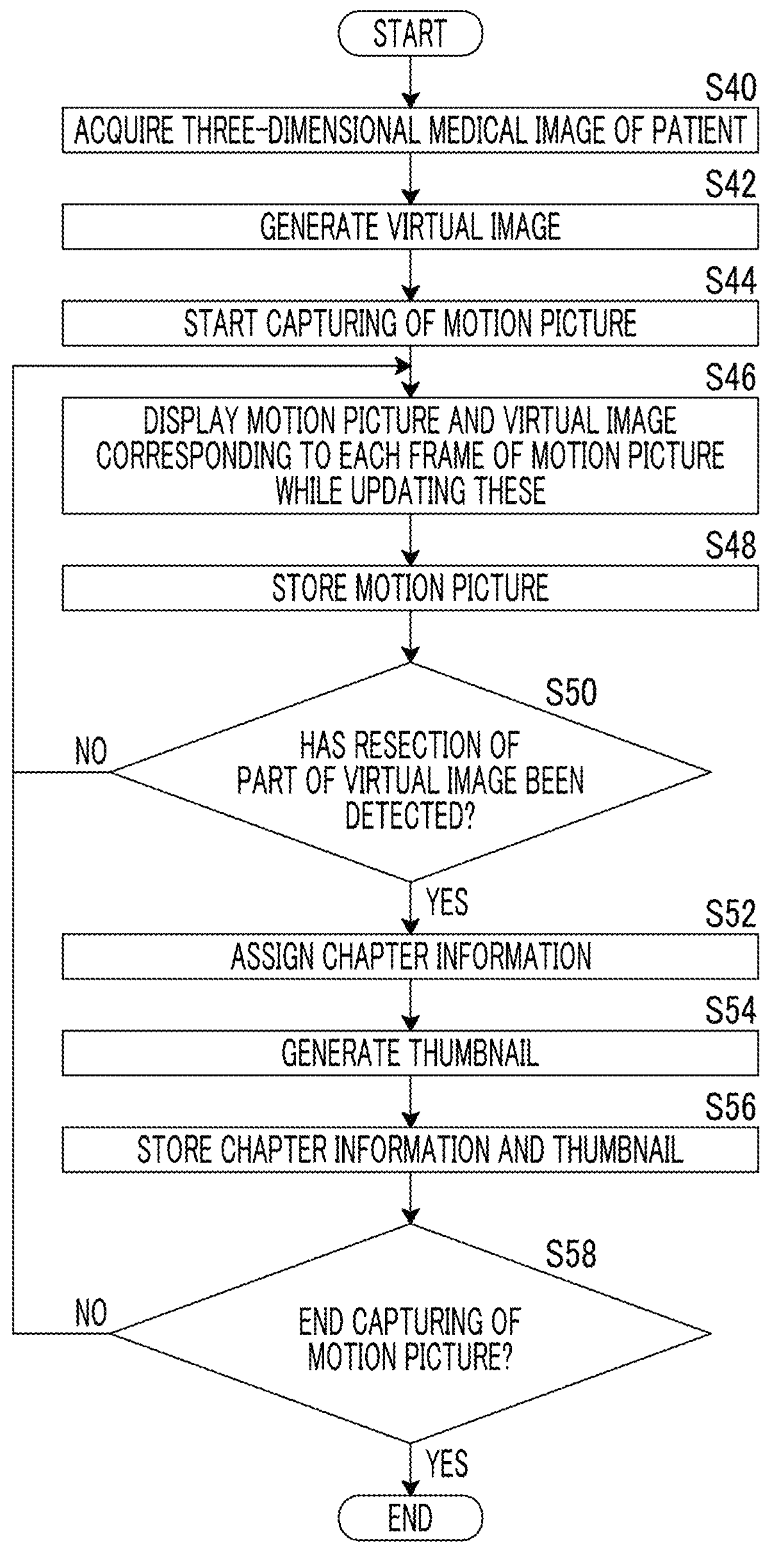
FIG. 9
START
S40
ACQUIRE THREE-DIMENSIONAL MEDICAL IMAGE OF PATIENT
S42
GENERATE VIRTUAL IMAGE
S44
START CAPTURING OF MOTION PICTURE
S46
DISPLAY MOTION PICTURE AND VIRTUAL IMAGE CORRESPONDING TO EACH FRAME OF MOTION PICTURE WHILE UPDATING THESE
S48
STORE MOTION PICTURE
S50
HAS RESECTION OF PART OF VIRTUAL IMAGE BEEN DETECTED?
NO
YES
S52
ASSIGN CHAPTER INFORMATION
S54
GENERATE THUMBNAIL
S56
STORE CHAPTER INFORMATION AND THUMBNAIL
S58
END CAPTURING OF MOTION PICTURE?
NO
YES
END

MEDICAL IMAGE STORAGE AND REPRODUCTION APPARATUS, METHOD, AND PROGRAM

CROSS-REFERENCE TO RELATED APPLICATION

This application claims priority under 35 USC 119 from Japanese Patent Application No. 2016-189796 filed on Sep. 28, 2016, the disclosure of which is incorporated by reference herein.

BACKGROUND OF THE INVENTION

1. Field of the Invention

The present invention relates to a medical image storage and reproduction apparatus, method, and program for storing a motion picture obtained by imaging an imaging target and reproducing the stored motion picture from a desired point in time.

2. Description of the Related Art

In recent years, in all medical scenes, such as liver or lung resection surgery, craniotomy, insertion of a cardiac catheter, and examinations using a rigid endoscope or a flexible endoscope, navigation technology for supporting surgery has been drawing attention. A common goal in the fields is to indicate the location of a characteristic region, such as a tumor. This makes it possible to perform treatment so as to avoid the characteristic region or be directed to the characteristic region.

In addition, for recording of surgery, capturing of a motion picture during the surgery is performed. For example, the full situation of surgery is imaged by a video camera, or the situation of surgery is imaged using an imaging apparatus such as an endoscope.

Due to such an imaging record, it is possible to give surgical feedback, such as whether or not the procedure is correct or where the procedure is wrong.

SUMMARY OF THE INVENTION

However, the surgical time varies from several tens of minutes to several hours. Accordingly, in the case of trying to check a motion picture corresponding to a part of the surgical time, it is very difficult to find out the motion picture. For example, in the case of trying to check a motion picture captured by a bronchial endoscope, even if an attempt is made to check a motion picture in a case where the bronchial endoscope is inserted into a desired route in the bronchus, it is difficult to specify the location unless a motion picture captured from the entrance of the bronchus is checked. Therefore, it is necessary to reproduce the motion picture from the beginning.

Generally, as a method of checking a motion picture from a desired point in time, there is a method of assigning chapter information to a motion picture. For example, JP2016-42982A proposes assigning chapter information to a motion picture based on an operation instruction for an imaging apparatus. In JP2016-42982A, however, nothing has been proposed for a method of reproducing a motion picture from a desired point of time of a recorded motion picture. In addition, the point in time of the operation instruction for the imaging apparatus is not necessarily an important point in time in the case of reproducing the motion picture of the surgery.

JP2011-036372A proposes a method of detecting an operation of a surgical instrument, biological information, or the like while capturing a motion picture during surgery, detecting as a feature point a point in time at which the operation of the surgical instrument has been performed or a point in time at which the biological information falls outside the threshold value range, and generating and displaying a motion picture shortened by connecting the characteristic points. In JP2011-036372A, however, nothing has been proposed for the method of reproducing a motion picture from a desired point of time of a recorded motion picture.

WO2006/001055A proposes measuring the biological information of an operator and assigning an index to a motion picture according to the measured information. However, although WO2006/001055A also proposes taking out a still image at a point in time at which an index is assigned, nothing has been proposed for the method of reproducing a motion picture from a desired point of time of a recorded motion picture.

JP2005-267033A proposes recording operation information for an object in a virtual space together with a video in a real space and reproducing the video based on the operation information in a head mounted display for displaying the real space and the virtual space in combination. In JP2005-267033A, however, since chapter information is also assigned to an operation performed to change the visual field or the like, there is a problem that useless chapter information is easily assigned.

In view of the above circumstances, it is an object of the invention to provide a medical image storage and reproduction apparatus, method, and program capable of assigning chapter information at a more appropriate point in time to a motion picture obtained by imaging a scene during surgery or during examination and of reproducing the motion picture from a point in time that the user desires.

A first medical image storage and reproduction apparatus of the invention comprises: a storage unit that stores a motion picture obtained by imaging an imaging target; a virtual image generation unit that generates a virtual image based on a three-dimensional medical image obtained by imaging the imaging target in advance; a chapter information assignment unit that detects an anatomical feature or a functional feature from the virtual image corresponding to an updated frame according to updating of each frame of the motion picture and assigns chapter information to the motion picture based on the detection point in time; and a display control unit that displays a selection screen, which is for receiving selection of one or more pieces of chapter information from a plurality of pieces of chapter information assigned to the motion picture, on a display unit. The display control unit reproduces the stored motion picture based on the chapter information received on the selection screen, and displays the reproduced motion picture on the display unit.

In the medical image storage and reproduction apparatus of the invention, in a case where a plurality of pieces of chapter information are selected on the selection screen, the display control unit can reproduce the stored motion picture based on an order of selection of the plurality of pieces of chapter information and display the reproduced motion picture on the display unit.

In the medical image storage and reproduction apparatus of the invention, the display control unit can display the three-dimensional medical image on the selection screen, and can display the chapter information for the displayed three-dimensional medical image.

In the medical image storage and reproduction apparatus of the invention, the display control unit can display the chapter information for the three-dimensional medical image based on positional information of the anatomical feature or the functional feature on the three-dimensional medical image.

The medical image storage and reproduction apparatus of the invention can further comprise a thumbnail generation unit that generates a thumbnail including at least one of a frame of the motion picture or the virtual image based on a detection point in time of the anatomical feature or the functional feature and stores the thumbnail and the chapter information so as to be associated with each other. The display control unit can display the chapter information and the thumbnail, which is associated with the chapter information, on the selection screen.

In the medical image storage and reproduction apparatus of the invention, the storage unit can store a motion picture obtained by imaging a bronchus as the imaging target with an endoscope, and the virtual image generation unit can generate a virtual endoscopic image of an inside of the bronchus as the virtual image.

In the medical image storage and reproduction apparatus of the invention, the display control unit can display a three-dimensional medical image of the bronchus on the selection screen and display the plurality of pieces of chapter information for the three-dimensional medical image of the bronchus based on positional information of the anatomical feature or the functional feature on the three-dimensional medical image. In a case where one of the plurality of pieces of chapter information is selected on the selection screen, chapter information on a shortest path from a proximal end of the bronchus to a position of the selected one piece of chapter information on the three-dimensional medical image can be selected, and the stored motion picture from the proximal end of the bronchus to the position of the selected one piece of chapter information on the three-dimensional medical image can be reproduced based on the selected chapter information on the shortest path and be displayed on the display unit.

In the medical image storage and reproduction apparatus of the invention, the display control unit can display a three-dimensional medical image of the bronchus on the selection screen and display the plurality of pieces of chapter information for the three-dimensional medical image of the bronchus based on positional information of the anatomical feature or the functional feature on the three-dimensional medical image. In a case where two of the plurality of pieces of chapter information are selected on the selection screen, chapter information on a shortest path from a position of one of the selected two pieces of chapter information on the three-dimensional medical image to a position of the other piece of chapter information on the three-dimensional medical image can be selected, and the stored motion picture from the position of the one piece of chapter information on the three-dimensional medical image to the position of the other piece of chapter information on the three-dimensional medical image can be reproduced based on the selected chapter information on the shortest path and be displayed on the display unit.

In the medical image storage and reproduction apparatus of the invention, the chapter information assignment unit can detect a branch of the bronchus from the virtual endoscopic image as the anatomical feature.

In the medical image storage and reproduction apparatus of the invention, the storage unit can store a motion picture obtained by imaging a liver as the imaging target, and the virtual image generation unit can generate a virtual image of the liver.

In the medical image storage and reproduction apparatus of the invention, the chapter information assignment unit can detect a resected part of the liver from a virtual image of the liver as the anatomical feature.

In the medical image storage and reproduction apparatus of the invention, the display control unit can display each frame of the motion picture and a virtual image corresponding to each frame on the display unit side by side.

A second medical image storage and reproduction apparatus of the invention comprises: a storage unit that stores a motion picture obtained by imaging a bronchus with an endoscope; a virtual image generation unit that generates a virtual endoscopic image based on a three-dimensional medical image obtained by imaging the bronchus in advance; a chapter information assignment unit that detects a branch of the bronchus from the virtual endoscopic image and assigns chapter information to the motion picture based on the detection point in time; and a display control unit that displays a selection screen, which is for receiving selection of one or more pieces of chapter information from a plurality of pieces of chapter information, on a display unit by displaying the plurality of pieces of chapter information assigned to the motion picture for the three-dimensional medical image based on positional information of a branch of the bronchus on the three-dimensional medical image. The display control unit reproduces the stored motion picture based on the chapter information received on the selection screen, and displays the reproduced motion picture on the display unit.

A medical image storage and reproduction method of the invention is a medical image storage and reproduction method for storing a motion picture obtained by imaging an imaging target and reproducing the stored motion picture. The medical image storage and reproduction method comprises: generating a virtual image based on a three-dimensional medical image obtained by imaging the imaging target in advance; detecting an anatomical feature or a functional feature from the virtual image corresponding to an updated frame according to updating of each frame of the motion picture and assigning chapter information to the motion picture based on the detection point in time; displaying a selection screen, which is for receiving selection of one or more pieces of chapter information from a plurality of pieces of chapter information assigned to the motion picture, on a display unit; and reproducing the stored motion picture based on the chapter information received on the selection screen and displaying the reproduced motion picture on the display unit.

A medical image storage and reproduction program of the invention is a medical image storage and reproduction program causing a computer to execute a step of storing a motion picture obtained by imaging an imaging target and a step of reproducing the stored motion picture. The medical image storage and reproduction program causes the computer to execute: a step of generating a virtual image based on a three-dimensional medical image obtained by imaging the imaging target in advance; a step of detecting an anatomical feature or a functional feature from the virtual image corresponding to an updated frame according to updating of each frame of the motion picture and assigning chapter information to the motion picture based on the detection point in time; a step of displaying a selection screen, which is for receiving selection of one or more pieces of chapter information from a plurality of pieces of chapter information assigned to the motion picture, on a display unit; and a step of reproducing the stored motion picture based on the chapter information received on the selection screen and displaying the reproduced motion picture on the display unit.

According to the first and second medical image storage and reproduction apparatuses, the medical image storage and reproduction method, and the medical image storage and reproduction program of the invention, the virtual image is generated based on the three-dimensional medical image obtained by imaging the imaging target in advance, the anatomical feature or the functional feature is detected from the virtual image corresponding to the updated frame according to the updating of each frame of the motion picture, and the chapter information is assigned to the motion picture based on the detection point in time. Therefore, it is possible to assign the chapter information at the more appropriate point in time to the motion picture obtained by imaging a scene during surgery, examination, or the like.

In addition, the selection screen for receiving the selection of one or more pieces of chapter information from the plurality of pieces of chapter information assigned to the motion picture is displayed, and the stored motion picture is reproduced based on the chapter information received on the selection screen. Therefore, it is possible to reproduce the motion picture from the point of time that the user desires.

BRIEF DESCRIPTION OF THE DRAWINGS

FIG. 9 is a flowchart illustrating an operation of storing a motion picture in the medical image diagnosis assistance system using another embodiment of the medical image storage and reproduction apparatus of the invention.

DESCRIPTION OF THE PREFERRED EMBODIMENTS

Figure 1:
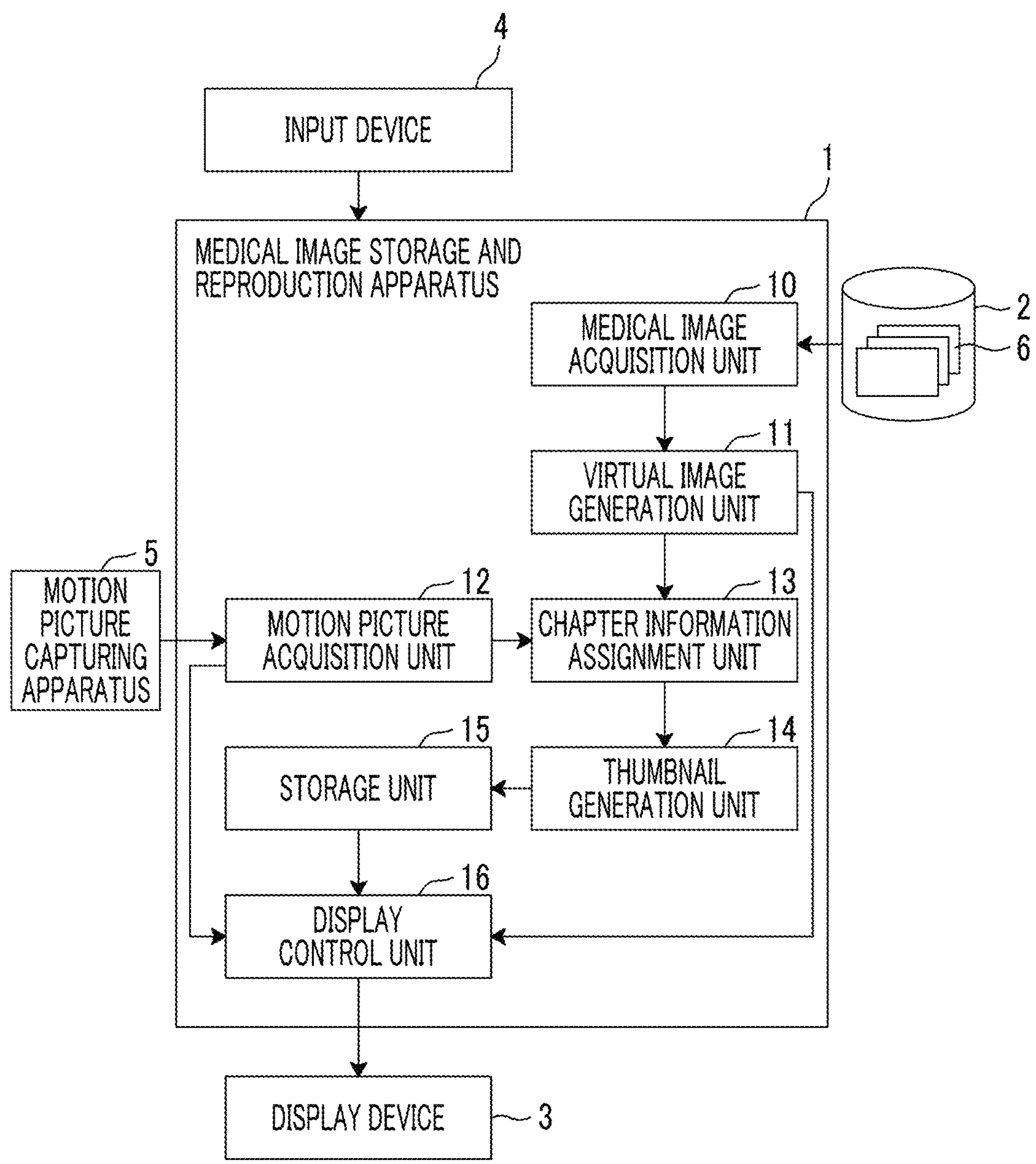
FIG. 1 is a block diagram showing the schematic configuration of a medical image diagnosis assistance system using an embodiment of a medical image storage and reproduction apparatus of the invention.

Hereinafter, a medical image diagnosis assistance system using an embodiment of a medical image storage and reproduction apparatus, method, and program of the invention will be described in detail with reference to the diagrams. FIG. 1 is a block diagram showing the schematic configuration of a medical image diagnosis assistance system of the present embodiment.

The medical image diagnosis assistance system of the present embodiment acquires a motion picture by imaging a patient in a medical scene, such as during surgery or during examination, and stores the motion picture. Then, in the case of reproducing the stored motion picture, a user, such as a doctor, can reproduce and observe the motion picture from a desired point of time.

Specifically, as shown in FIG. 1, the medical image diagnosis assistance system of the present embodiment includes a medical image storage and reproduction apparatus 1, a medical image storage server 2, a display device 3 (corresponding to a display unit), an input device 4, and a motion picture capturing apparatus 5.

The medical image storage and reproduction apparatus 1 is obtained by installing a medical image storage and reproduction program of the present embodiment in a computer.

The medical image storage and reproduction apparatus 1 includes a central processing unit (CPU), a semiconductor memory, and a storage device such as a hard disk or a solid state drive (SSD). The medical image storage and reproduction program of the present embodiment is installed in the storage device, and the central processing unit executes the medical image storage and reproduction program to operate a medical image acquisition unit 10, a virtual image generation unit 11, a motion picture acquisition unit 12, a chapter information assignment unit 13, a thumbnail generation unit 14, a storage unit 15, and a display control unit 16 shown in FIG. 1.

The medical image storage and reproduction program is distributed by being recorded on a recording medium, such as a digital versatile disc (DVD) and a compact disc read only memory (CD-ROM), and is installed into the computer from the recording medium. Alternatively, the medical image storage and reproduction program is stored in a storage device of a server computer connected to the network or in a network storage so as to be accessible from the outside, and is downloaded and installed into the computer in response to a request.

The medical image acquisition unit 10 acquires a three-dimensional medical image 6 of a patient captured in advance. The three-dimensional medical image 6 is obtained by imaging a patient using a computed tomography (CT) apparatus or a magnetic resonance imaging (MRI) apparatus, for example. In the present embodiment, a case of acquiring the three-dimensional medical image 6 of the patient's chest will be described.

The three-dimensional medical image 6 is stored in the medical image storage server 2 in advance together with the identification information of the patient, and the medical image acquisition unit 10 reads the three-dimensional medical image 6 having the identification information from the medical image storage server 2 based on the identification information of the patient, which has been input by the user using the input device 4 or the like, and temporarily stores the read three-dimensional medical image 6.

The virtual image generation unit 11 generates a virtual image based on the three-dimensional medical image 6 acquired by the medical image acquisition unit 10. The virtual image generation unit 11 of the present embodiment acquires the three-dimensional medical image 6 of the chest, extracts a region of the bronchus (imaging target) from the three-dimensional medical image 6, and generates a virtual endoscopic image based on the three-dimensional medical image 6 of the bronchial region. The virtual endoscopic image is an image in which an endoscopic image obtained by imaging a luminal organ, such as a bronchus, with an endoscope is expressed on the virtual space.

Specifically, the virtual image generation unit 11 extracts a graph structure of a bronchial region included in the input three-dimensional medical image 6 using the method disclosed in JP2010-220742A, for example. Hereinafter, an example of the graph structure extraction method will be described.

In the three-dimensional medical image 6, pixels inside the bronchus are expressed as a region showing a low pixel value since the pixels correspond to an air region. However, the bronchial wall is expressed as a cylindrical or linear structure showing relatively high pixel values. Therefore, the bronchus is extracted by performing structural analysis of the shape based on the distribution of pixel values for each pixel.

The bronchus branches in multiple stages, and the diameter of the bronchus decreases as the distance from the distal end decreases. The virtual image generation unit 11 generates a plurality of three-dimensional medical images with different resolutions by performing multi-resolution conversion of the three-dimensional medical images 6 so that bronchi having different sizes can be detected, and applies a detection algorithm for each three-dimensional medical image 6 of each resolution, thereby detecting tubular structures having different sizes.

First, at each resolution, a Hessian matrix of each pixel of the three-dimensional medical image is calculated, and it is determined whether or not the pixel is a pixel in the tubular structure from the magnitude relationship of eigenvalues of the Hessian matrix. The Hessian matrix is a matrix having, as its elements, partial differential coefficients of the second order of density values in the respective axes (x, y, and z axes of the three-dimensional image), and is a 3×3 matrix as in the following equation.

[Equation 1]

$$\nabla^2 I = \begin{bmatrix} I_{xx} & I_{xy} & I_{xz} \\ I_{xx} & I_{xy} & I_{xz} \\ I_{xx} & I_{xy} & I_{xz} \end{bmatrix}, I_{xx} = \frac{\delta^2 I}{\delta x^2}, I_{xy} = \frac{\delta^2 I}{\delta x \delta y^2}, \ldots$$

Assuming that the eigenvalues of the Hessian matrix at an arbitrary pixel are λ1, λ2, and λ3, it is known that the pixel is a tubular structure in a case where two of the eigenvalues are large and one eigenvalue is close to 0, for example, in a case where λ3, λ2>>λ1 and λ1≅0 are satisfied. In addition, an eigenvector corresponding to the minimum eigenvalue (λ1≅0) of the Hessian matrix matches a main axis direction of the tubular structure.

The bronchus can be expressed in a graph structure, but the tubular structure extracted in this manner is not necessarily detected as one graph structure, in which all tubular structures are connected to each other, due to the influence of a tumor or the like. Therefore, after the detection of the tubular structure from the entire three-dimensional medical image 6 is ended, and it is evaluated whether or not each extracted tubular structure is within a predetermined distance and an angle between the direction of the basic line connecting arbitrary points on the extracted two tubular structures to each other and the main axis direction of each tubular structure is within a predetermined angle. By determining whether or not a plurality of tubular structures are connected to each other as described above, the connection relationship of the extracted tubular structures is reconstructed. By this reconstruction, the extraction of the graph structure of the bronchus is completed.

Then, the virtual image generation unit 11 classifies the extracted graph structure into a start point, an end point, a branch point, and a side and connects the start point, the end point, and the branch point to each other with the side, thereby being able to obtain a three-dimensional graph structure showing the bronchi. Here, the branch point is a voxel having a connection number of three or more. The method of generating a graph structure is not limited to the method described above, but other methods may be adopted.

The virtual image generation unit 11 sets a plurality of positions that are set at predetermined intervals along the path from the start point to the end point of the bronchus, as viewpoints, along the graph structure of the bronchus. In addition, a branch point is also set as a viewpoint. Then, a projection image obtained by central projection, in which the three-dimensional medical image 6 on a plurality of lines of sight radially extending in the traveling direction of the distal end of the endoscope from the viewpoint is projected onto the projection plane, is acquired as a virtual endoscopic image. As a specific central projection method, for example, a known volume rendering method can be used. In addition, it is assumed that the angle of view (range of the line of sight) of the virtual endoscope image and the center (center in the projection direction) of the field of view are set in advance by user's input or the like.

The virtual image generation unit 11 may generate only a virtual endoscopic image along a predetermined target route in the bronchus.

The motion picture acquisition unit 12 acquires a motion picture captured by the motion picture capturing apparatus 5. The motion picture capturing apparatus 5 in the present embodiment is a bronchial endoscope that is inserted into the bronchus to image the inside of the bronchus. The bronchial endoscope includes an imaging device, such as a charge-coupled device (CCD) image sensor or a complementary metal-oxide semiconductor (CMOS) image sensor. The bronchial endoscope images the inner wall of the bronchus at a predetermined frame rate using the imaging device, and outputs the image signal of each frame to the medical image storage and reproduction apparatus 1. In this specification, the image signal of each frame is simply referred to as a frame.

Figure 2:
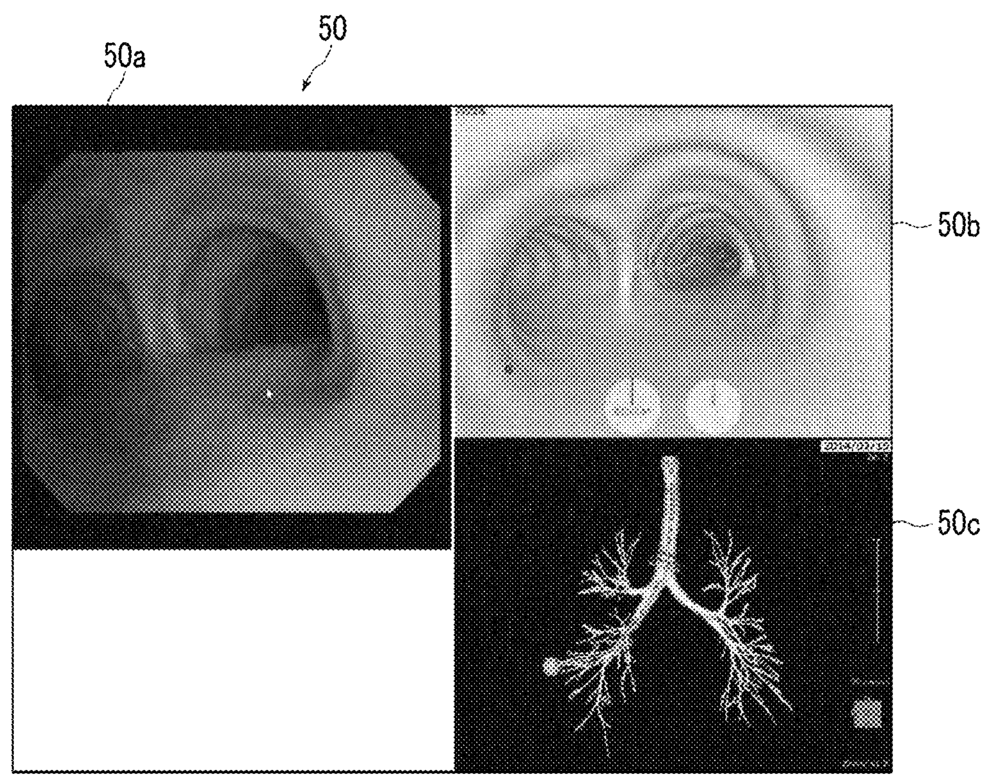
FIG. 2 is a diagram showing an example of a window screen for displaying a motion picture, a virtual image, and a three-dimensional medical image.

In the present embodiment, a window screen 50 shown in FIG. 2 is displayed by the display device 3. Within the window screen 50, a motion picture display region 50*a*, a virtual image display region 50*b*, and a three-dimensional medical image display region 50*c* are provided. The motion picture acquired by the motion picture acquisition unit 12 is output to the display control unit 16, and the display control unit 16 displays the input motion picture in the motion picture display region 50*a*.

The display control unit 16 displays a virtual endoscopic image of the bronchus generated by the virtual image generation unit 11 in the virtual image display region 50*b*, and displays a three-dimensional medical image of the appearance of the bronchial region in the three-dimensional medical image display region 50*c*.

In the case of displaying the virtual endoscopic image of the bronchus in the virtual image display region 50*b*, the display control unit 16 specifies a virtual endoscopic image corresponding to the frame displayed in the motion picture display region 50*a*, and displays the specified virtual endoscopic image in the virtual image display region 50*b*. Then, the display control unit 16 displays each frame of the motion picture and the virtual endoscopic image corresponding to each frame while updating these in conjunction with each other.

The virtual endoscopic image corresponding to each frame of the motion picture is a virtual endoscopic image generated with almost the same position as the imaging position of each frame of the motion picture as a viewpoint. As a method of specifying each frame of the motion picture, for example, matching processing between the frame of the motion picture and the virtual endoscopic image of each viewpoint may be performed, and a virtual endoscopic image corresponding to the frame of the motion picture may be specified from the virtual endoscopic images of the respective viewpoints. As the matching processing, it is possible to use known methods, such as a method used as matching processing on a two-dimensional image and a method of recognizing the branching structure of the bronchus from the frame of the motion picture and matching these with the three-dimensional medical image of the bronchus.

The chapter information assignment unit 13 detects an anatomical feature or a functional feature from the virtual endoscopic image corresponding to the updated frame according to the updating of each frame of the motion picture, and assigns chapter information to the motion picture based on the detection point in time.

As a method of detecting the branching structure of the bronchus, for example, a branching structure may be detected by detecting a circular dark image from a virtual endoscopic image.

Here, the chapter information is information indicating the segmentation of a motion picture. In the present embodiment, as described above, a branching structure is detected from a virtual endoscopic image corresponding to each frame of the motion picture, and chapter information is assigned to the motion picture based on the detection point in time. Therefore, the chapter information of the present embodiment is information indicating a point in time at which a branching structure appears in a motion picture obtained by imaging the inside of the bronchus, that is, a point in time at which each branch of the bronchus starts. By assigning the chapter information to the motion picture in this manner, it is possible to segment a motion picture obtained by imaging the inside of the bronchus according to a point in time at which each branch of the bronchus appears. As the chapter information, for example, numerical values, such as 1, 2, 3, . . . , may be incremented and assigned to the motion picture every time a branching structure appears in the virtual endoscopic image. However, the chapter information is not limited to numerical values, but letters, such as a, b, c, . . . , may be used, or other types of text information may be used. The chapter information may be a time at the point in time at which the chapter information is assigned. In addition, the chapter information may be a combination of the above-described numerical values or characters and time.

Figure 3:
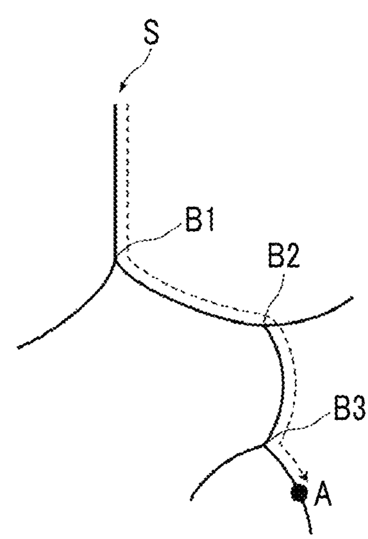
FIG. 3 is a diagram illustrating an example of a method of assigning chapter information.

For example, as shown in FIG. 3, in a case where the bronchial endoscope images a path returning to the proximal end S side of the bronchus after reaching to a position A of the bronchus, even in a case where the bronchial endoscope passes through branches B1, B2, and B3 appearing on the way toward the position A in the case of returning to the proximal end S side again, new chapter information is assigned to the branches B1, B2, and B3 appearing at the second time. Specifically, for example, in a case where numerical values are assigned as chapter information, in a case where the distal end of the bronchial endoscope is headed to the position A, chapter information "1" is assigned at a point in time at which the branch B1 is detected, chapter information "2" is assigned at a point in time at which the branch B2 is detected, and chapter information "3" is assigned at a point in time at which the branch B3 is detected. Then, in a case where the distal end of the bronchial endoscope returns to the proximal end S after reaching the position A, chapter information "4" is assigned at a point in time at which the branch B3 is detected, chapter information "5" is assigned at a point in time at which the branch B2 is detected, and chapter information "6" is assigned at a point in time at which the branch B1 is detected.

In the present embodiment, as described above, the branching structure of the bronchus is detected as the anatomical feature from the virtual endoscopic image. However, the invention is not limited thereto, and the functional feature of the bronchus may be detected, and chapter information may be assigned to the motion picture based on the detection point in time. The functional feature of the bronchus is a feature reflecting the function of the bronchus. As the functional feature, for example, it can be detected that the inner wall of the bronchus is inflamed and the shape changes. Specifically, in a case where the inner wall of the bronchus is inflamed or swollen or there is bronchial mucus, such as sputum, the shape change on the virtual endoscopic image can be expressed in red color. Therefore, chapter information may be assigned to the motion picture based on the point in time at which the red color is detected. By assigning the chapter information to the motion picture in this manner, it is possible to segment a motion picture obtained by imaging the inside of the bronchus according to a point in time at which inflammation of the inner wall of the bronchus appears. The shape change is not limited to the above example, but foreign matter clogging or the like may be mentioned. In the case of assigning chapter information based on the detection point in time of the functional feature, by calculating a viewpoint position on a three-dimensional medical image of the virtual endoscopic image in which the functional feature has been detected, it is possible to acquire a display position on the three-dimensional medical image.

Then, in a case where the branching structure of the bronchus is detected as the anatomical feature from the virtual endoscopic image as described above, the thumbnail generation unit 14 generates a thumbnail of the virtual endoscopic image at the detection point in time, and associates the thumbnail with the chapter information at the point in time at which the thumbnail is generated. In the present embodiment, the thumbnail of the virtual endoscopic image is generated. However, the invention is not limited thereto, and a thumbnail of a frame of a motion picture corresponding to the virtual endoscopic image at a point in time at which the branching structure of the bronchus is detected may be generated. In addition, a thumbnail of the window screen 50 in which the virtual endoscopic image and the frame of the motion picture are arranged may be generated. The thumbnail is generated by performing reduction processing on a virtual endoscopic image, a frame of a motion picture, or an image showing the entire window screen 50.

The storage unit 15 stores the motion picture acquired by the motion picture acquisition unit 12. Specifically, chapter information is assigned to the motion picture acquired by the motion picture acquisition unit 12 as described above, and a thumbnail is associated with the chapter information. Therefore, in the storage unit 15, chapter information and the thumbnail associated with each of the pieces of chapter information are stored together with the motion picture. The storage unit 15 is formed by a semiconductor memory or a hard disk, for example.

The display control unit 16 displays the motion picture acquired by the motion picture acquisition unit 12, the virtual endoscopic image of the inner wall of the bronchus, and the three-dimensional medical image of the appearance of the bronchus on the window screen 50 of the display device 3 as described above.

Figure 4:
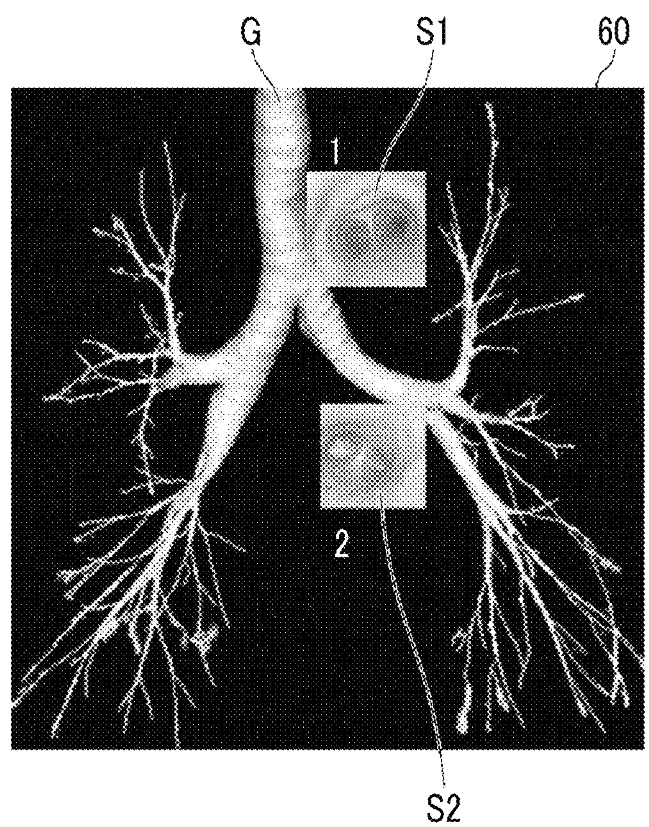
FIG. 4 is a diagram showing an example of a selection screen for receiving the selection of chapter information.

After the chapter information and the thumbnail are stored in the storage unit 15 together with the motion picture, the display control unit 16 of the present embodiment displays a selection screen, which is for receiving the selection of one or more pieces of chapter information from a plurality of pieces of chapter information assigned to the motion picture, on the display device 3. FIG. 4 is a diagram showing an example of a selection screen 60 for receiving the selection of chapter information. A three-dimensional medical image G of the appearance of the bronchus, numerical values indicating chapter information, and thumbnails S1 and S2 corresponding to the chapter information are displayed within the selection screen 60 of the present embodiment. As shown in FIG. 4, the chapter information and the thumbnails S1 and S2 are displayed in the vicinity of the position of the branching structure detected at a point in time at which the chapter information is assigned. For the chapter information, the display position can be acquired by calculating the viewpoint position on the three-dimensional medical image of the virtual endoscopic image in which the branching structure has been detected.

The selection screen 60 may be displayed separately from the window screen 50 described above, or may be displayed in the three-dimensional medical image display region 50*c* of the window screen 50. The selection screen 60 may be switched between display and non-display by the user's instruction input using the input device 4. In a case where the selection screen 60 is displayed in the three-dimensional medical image display region 50*c*, display and non-display of the chapter information and the thumbnail may be switched.

Figure 5:
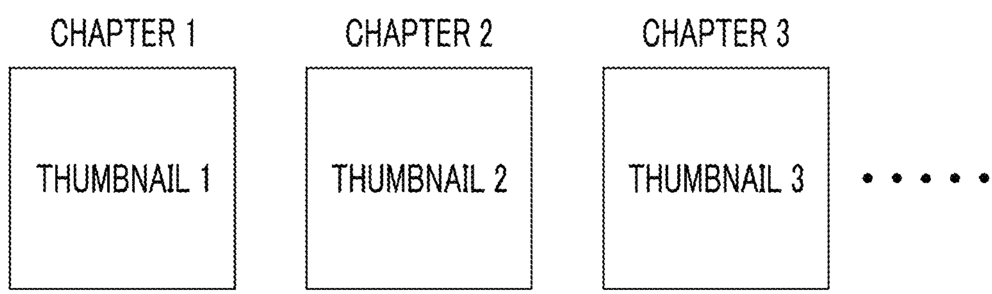
FIG. 5 is a diagram showing another example of the selection screen for receiving the selection of chapter information.

The selection screen 60 is not limited to the display form shown in FIG. 4, but other display forms may be adopted as long as it is possible to receive the selection of chapter information. Specifically, for example, as shown in FIG. 5, a selection screen on which combinations of chapter information and thumbnails are arranged may be displayed without displaying the three-dimensional medical image of the appearance of the bronchus.

Then, on the selection screen 60 shown in FIG. 4, at least one of chapter information "1" or chapter information "2" is selected, and the selected information is received by the display control unit 16. For the selection of chapter information, for example, the user designates desired chapter information or thumbnails using the input device 4, such as a pointing device. Alternatively, in a case where the display device 3 has a touch panel, the user may designate desired chapter information or thumbnails on the touch panel.

In a case where the chapter information is selected within the selection screen 60, the display control unit 16 reproduces a motion picture after the point in time, at which the chapter information has been assigned, from the storage unit 15, and displays the motion picture on the display device 3. For example, in a case where the chapter information "1" shown in FIG. 4 is selected, a motion picture from the point in time at which the chapter information "1" is assigned to the last time may be reproduced, or a motion picture from the point in time at which the chapter information "1" is assigned to the point in time at which the chapter information "2" is assigned may be reproduced.

The display device 3 includes a display device, such as a liquid crystal display, and displays the window screen 50, the selection screen 60, and the like.

The input device 4 receives various setting inputs from the user, and includes an input device, such as a keyboard or a mouse. For example, the input device 4 receives a setting input of the identification information of a patient, a setting input of chapter information, and the like. The display device 3 may also be used as the input device 4 by using a touch panel. The medical image storage and reproduction apparatus 1, the display device 3, and the input device 4 may be formed by a tablet terminal.

Figure 6:
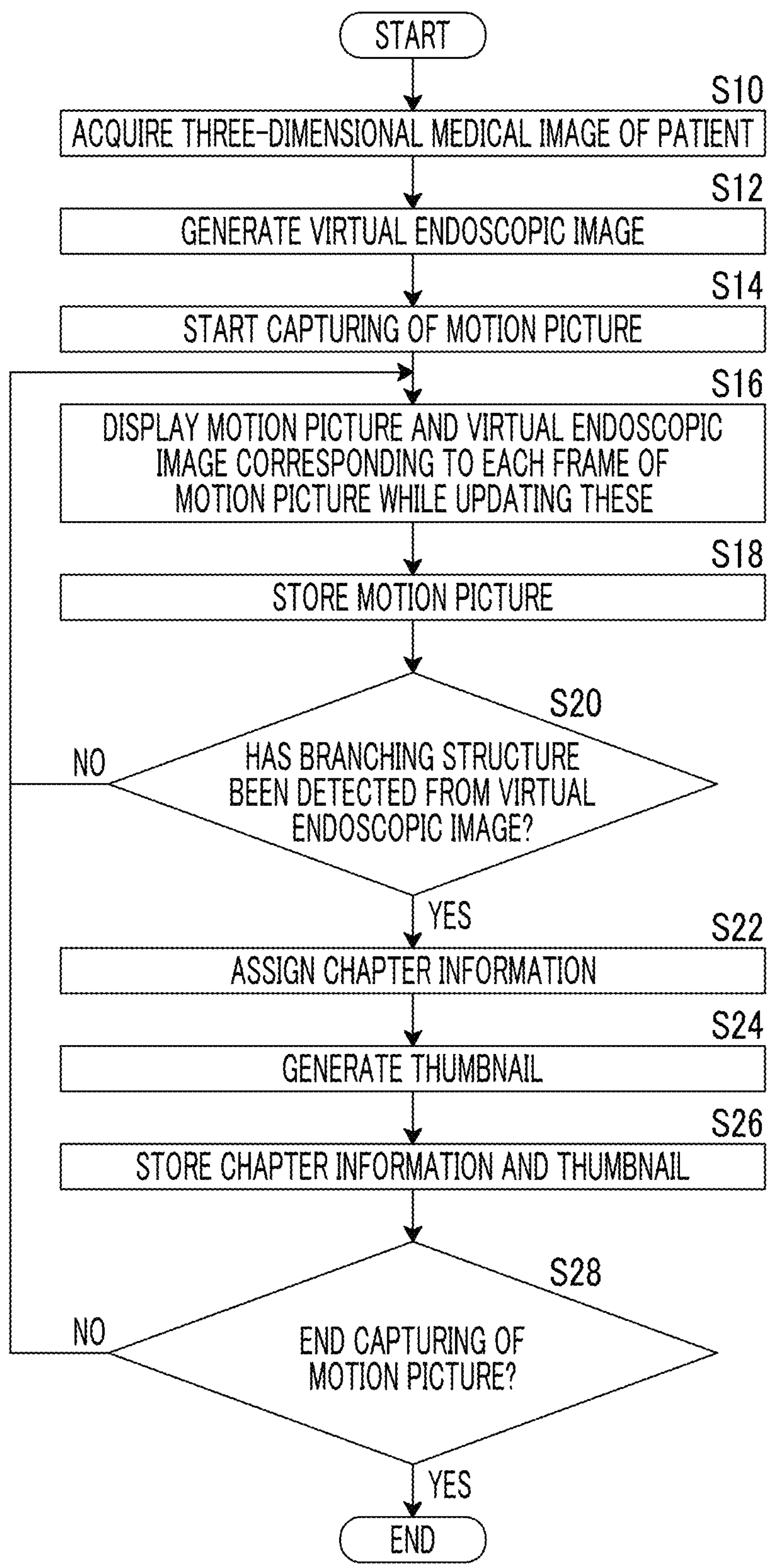
FIG. 6 is a flowchart illustrating an operation of storing a motion picture in the medical image diagnosis assistance system using an embodiment of the medical image storage and reproduction apparatus of the invention.

Next, the operation of the medical image diagnosis assistance system of the embodiment will be described with reference to the flowchart shown in FIG. 6. First, an operation of performing imaging using a bronchial endoscope and storing the captured motion picture will be described.

First, based on the input of identification information of a patient from the user, the medical image acquisition unit 10 reads and acquires the three-dimensional medical image 6 from the medical image storage server 2 (S10).

The three-dimensional medical image 6 acquired by the medical image acquisition unit 10 is input to the virtual image generation unit 11, and the virtual image generation unit 11 generates a virtual endoscopic image of the bronchus based on the input three-dimensional medical image 6 (S12).

On the other hand, a bronchial endoscope (motion picture capturing apparatus 5) is inserted into the bronchus of the patient, and the capturing of a motion picture of the inner wall of the bronchus is started (S14). The motion picture captured by the bronchial endoscope is acquired by the motion picture acquisition unit 12, and is displayed on the display device 3 by the display control unit 16. Specifically, the motion picture captured by the bronchial endoscope is displayed in the motion picture display region 50*a* of the window screen 50 shown in FIG. 2 displayed on the display device 3. The display control unit 16 specifies a virtual endoscopic image corresponding to the frame displayed in the motion picture display region 50*a*, and displays the specified virtual endoscopic image in the virtual image display region 50*b*. Then, the display control unit 16 displays each frame of the motion picture and the virtual endoscopic image corresponding to each frame while updating these in conjunction with each other (S16).

Then, the motion picture acquired by the motion picture acquisition unit 12 is stored in the storage unit 15 (S18). On the other hand, the virtual endoscopic image updated corresponding to each frame of the motion picture is input to the chapter information assignment unit 13, and the chapter information assignment unit 13 performs processing for detecting the branching structure of the bronchus on the input virtual endoscopic image. Then, in a case where the branching structure is detected from the virtual endoscopic image (S20, YES), the chapter information assignment unit 13 assigns chapter information to the motion picture based on the detection point in time of the branching structure (S22). In this case, the thumbnail generation unit 14 generates a thumbnail of the virtual endoscopic image in which the branching structure has been detected (S24). Then, the chapter information and the thumbnail are stored in the storage unit 15 together with the motion picture (S26).

Then, in a case in which the user inputs an instruction to end the imaging of the bronchial endoscope using the input device 4 (S28, YES), the capturing of the motion picture of the bronchus is ended. On the other hand, in a case where no instruction to end the imaging is input in S28 (S28, NO), the processing from S16 to S26 is repeatedly performed, and the motion picture captured by the bronchial endoscope is subsequently stored in the storage unit 15.

This is the explanation regarding the operation of performing imaging using the bronchial endoscope and storing the captured motion picture.

Figure 7:
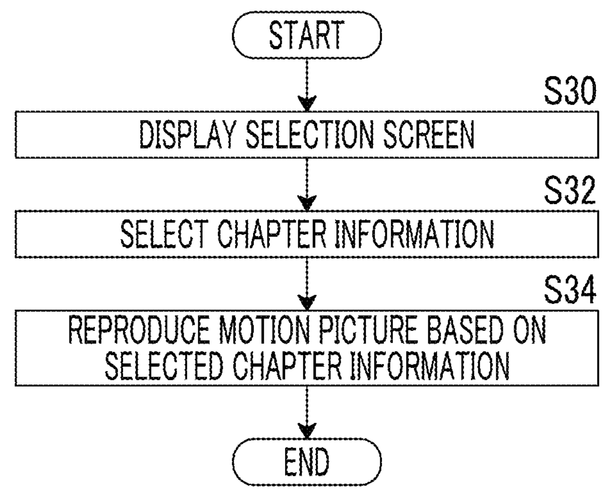
FIG. 7 is a flowchart illustrating an operation of reproducing a motion picture in the medical image diagnosis assistance system using an embodiment of the medical image storage and reproduction apparatus of the invention.

Next, the reproduction and display of the motion picture stored in the storage unit 15 will be described with reference to the flowchart shown in FIG. 7.

In the case of reproducing and displaying the motion picture stored in the storage unit 15, first, the selection screen 60 is displayed on the display device 3 as shown in FIG. 4 (S30).

Then, desired chapter information is selected by the user on the selection screen 60 (S32). Based on the chapter information selected by the user, the display control unit 16 reproduces the motion picture stored in the storage unit 15 and displays the motion picture on the display device 3 (S34). Specifically, a motion picture after the point in time at which the chapter information selected by the user is assigned is reproduced from the storage unit 15, and is displayed on the display device 3.

According to the medical image diagnosis assistance system of the embodiment described above, a virtual endoscopic image is generated based on a three-dimensional medical image obtained by imaging the bronchus in advance, a branch of the bronchus is detected from the virtual endoscopic image, and chapter information is assigned to the motion picture based on the detection point in time. Therefore, it is possible to assign chapter information at important points in time by bronchial observation.

In addition, by displaying a plurality of pieces of chapter information on the three-dimensional medical image of the bronchus, a selection screen for receiving the selection of one or more pieces of chapter information from the plurality of pieces of chapter information is displayed. Based on the chapter information received on the selection screen, the stored motion picture is reproduced. Therefore, it is possible to reproduce the motion picture from the point of time that the user desires.

The selection of chapter information does not necessarily have to be performed in the order in which branches of the bronchus appear. For example, the chapter information "1" may be selected after selecting the chapter information "2" shown in FIG. 4. In this case, after a motion picture after the point in time at which the chapter information "2" is assigned is reproduced, a motion picture after the point in time at which the chapter information "1" is assigned is reproduced.

In the embodiment described above, the chapter information assignment unit 13 automatically assigns chapter information. However, in addition to the automatically assigned chapter information, the user may further assign the chapter information manually. For example, chapter information may be assigned at the time of starting the capturing of a motion picture, or the user may set and input a trigger for assigning the chapter information using the input device 4.

In the above description of the embodiment, the motion picture is reproduced based on the chapter information selected by the user. However, a shortest path from the proximal end S of the bronchus to the position of the selected chapter information on the three-dimensional medical image may be calculated based on the chapter information selected by the user, and the motion picture of the shortest path may be reproduced.

Figure 8:
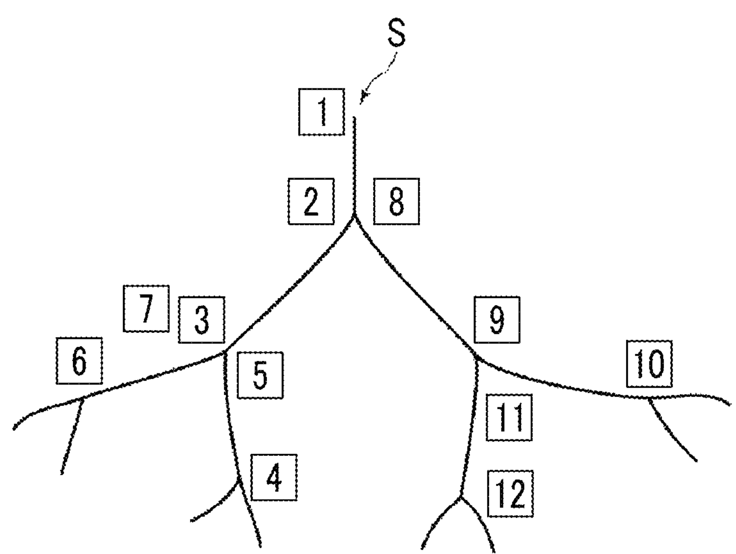
FIG. 8 is a diagram illustrating an embodiment for reproducing a motion picture of the shortest path of the bronchus.

Specifically, for example, as shown in FIG. 8, in a case where chapter information "1" to "12" are assigned and displayed on the selection screen, for example, in a case where the chapter information "10" is selected, the display control unit 16 selects the chapter information "8" and "9" on the shortest path from the proximal end of the bronchus to the position of the chapter information "10" on the three-dimensional medical image, and generates a play list including the chapter information "1", "8", "9", and "10".

Then, by reproducing the motion picture in the order of the chapter information of the play list, the motion picture is reproduced from the proximal end S of the bronchus to the position of the chapter information "10" on the three-dimensional medical image. In the present embodiment, it is assumed that the chapter information "1" is also assigned at the proximal end of the bronchus, that is, at the time of starting the capturing of the motion picture. The shortest path of the bronchus may be calculated using a known algorithm. The motion picture after the point in time at which the chapter information "10" is assigned may be reproduced, or may not be reproduced.

In the above description, the user selects only the chapter information "10". However, the invention is not limited thereto. In a case where the chapter information "1" and the chapter information "10" are selected, the display control unit 16 may select the chapter information "8" and "9" on the shortest path from the position of the chapter information "1" on the three-dimensional medical image to the position of the chapter information "10" on the three-dimensional medical image, and generate a play list including the chapter information "1", "8", "9", and "10". The first chapter information of the play list is not necessarily chapter information assigned to the proximal end of the bronchus. For example, in a case where the chapter information "8" and the chapter information "10" are selected by the user, a play list including the chapter information "8", "9", and "10" may be generated.

In the embodiment described above, the branch of the bronchus is detected. However, the invention is not limited thereto, and a tumor, a polyp, and the like may be further detected and chapter information may be assigned at the point in time at which these are detected. In this case, for example, by selecting chapter information in which a tumor or the like is present and generating a play list as described above, it is possible to reproduce the motion picture of the shortest path from the proximal end of the bronchus to the position where a tumor or the like is present.

In the embodiment described above, a virtual endoscopic image is automatically updated by performing matching processing between the frame of the motion picture and the virtual endoscopic image at each viewpoint. However, the invention is not limited thereto. Specifically, for example, the distal end position of the bronchial endoscope inserted into a patient may be detected using a sensor or the like, and the virtual endoscopic image may be automatically updated using detection information of the distal end position.

In the embodiment described above, the case has been described in which a bronchial endoscope is used as the motion picture capturing apparatus 5 and the motion picture captured by the bronchial endoscope is stored in the storage unit 15. However, the imaging target of the motion picture capturing apparatus 5 is not limited to the bronchus. For example, in the case of performing resection surgery for resecting a lesion part of the liver, the liver that is a surgery target may be an imaging target. Also in this case, a virtual image of the liver may be updated corresponding to the updating of each frame of the motion picture of the liver, and chapter information may be assigned to the motion picture of the liver based on the point in time at which the anatomical feature of the virtual image of the liver is detected. Hereinafter, an operation in the case of capturing and storing the motion picture of liver resection surgery will be described with reference to the flowchart shown in FIG. 9 and FIGS. 10 to 12.

First, in the same manner as in the embodiment described above, the medical image acquisition unit 10 reads and acquires the three-dimensional medical image 6 from the medical image storage server 2 based on the input of identification information of a patient from the user (S40).

The three-dimensional medical image 6 acquired by the medical image acquisition unit 10 is input to the virtual image generation unit 11, and the virtual image generation unit 11 generates a virtual image of the liver based on the input three-dimensional medical image 6 (S42). Here, the virtual image of the liver is generated by, for example, extracting a liver region from the three-dimensional medical image 6 of the abdomen and performing volume rendering on the three-dimensional medical image of the liver region. As the method of extracting the liver region, known methods can be used. In the present embodiment, since a motion picture of resection surgery for resecting a lesion part of the liver is captured as described above, a time-series virtual image simulating the resection surgery in advance is generated as a virtual image.

On the other hand, the abdomen of the patient is opened, and the imaging of the liver is started (S44). The motion picture capturing apparatus 5 for imaging the liver may be a video camera apparatus fixed in an operating room or may be a portable video camera apparatus.

The motion picture of the liver captured by the motion picture capturing apparatus 5 is acquired by the motion picture acquisition unit 12, and is displayed on the display device 3 by the display control unit 16. Specifically, the motion picture of the liver is displayed in the motion picture display region 50*a* of the window screen 50 shown in FIG. 10 displayed on the display device 3.

The display control unit 16 displays a virtual image corresponding to the frame, which is displayed in the motion picture display region 50*a*, in the virtual image display region 50*b*. As a method of specifying the virtual image corresponding to each frame of the motion picture, for example, matching processing between the frame of the motion picture and the time-series virtual images generated by preliminary simulation may be performed, and a virtual image having the highest degree of similarity may be specified from the time-series virtual images. The display control unit 16 displays the three-dimensional medical image of the appearance of the liver in the three-dimensional medical image display region 50*c*.

Then, the display control unit 16 displays each frame of the motion picture and the virtual image corresponding to each frame while updating these in conjunction with each other (S46).

Then, the motion picture acquired by the motion picture acquisition unit 12 is stored in the storage unit 15 (S48). On the other hand, the virtual image updated corresponding to each frame of the motion picture is input to the chapter information assignment unit 13, and the chapter information assignment unit 13 performs processing for detecting the contour of the liver on the input virtual image.

Figure 10:
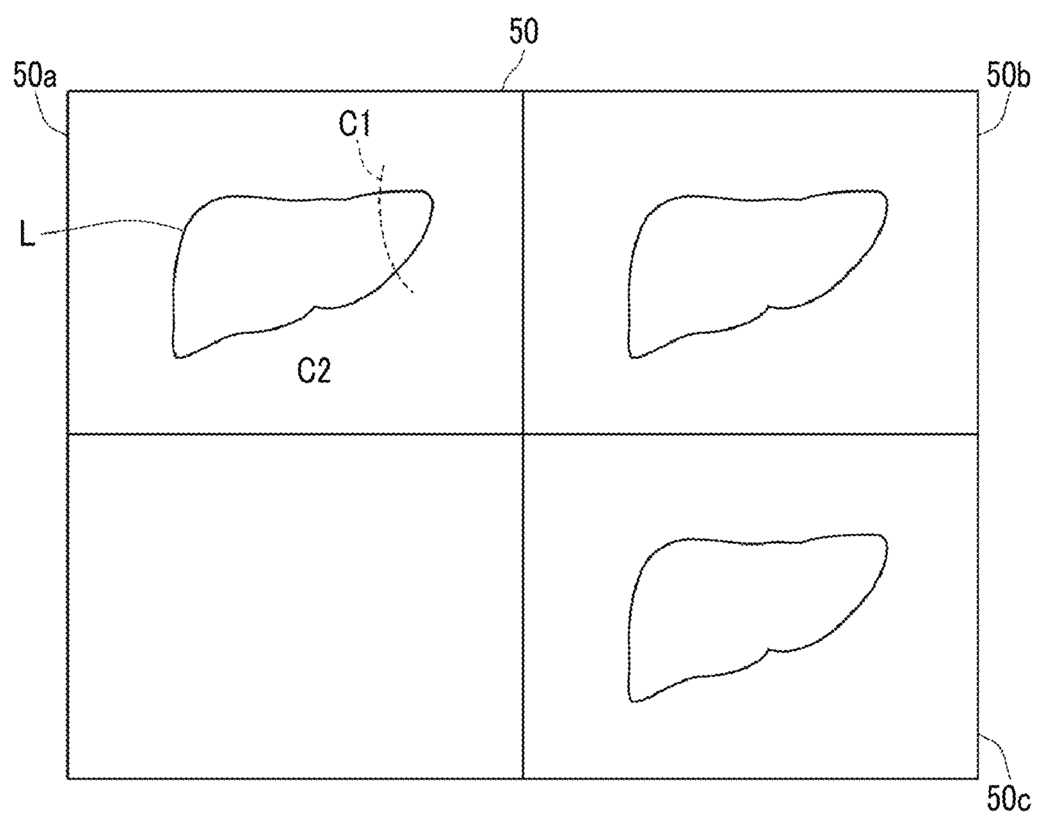
FIG. 10 is a diagram showing an example of a window screen for displaying a motion picture, a virtual image, and a three-dimensional medical image of the liver.
Figure 11:
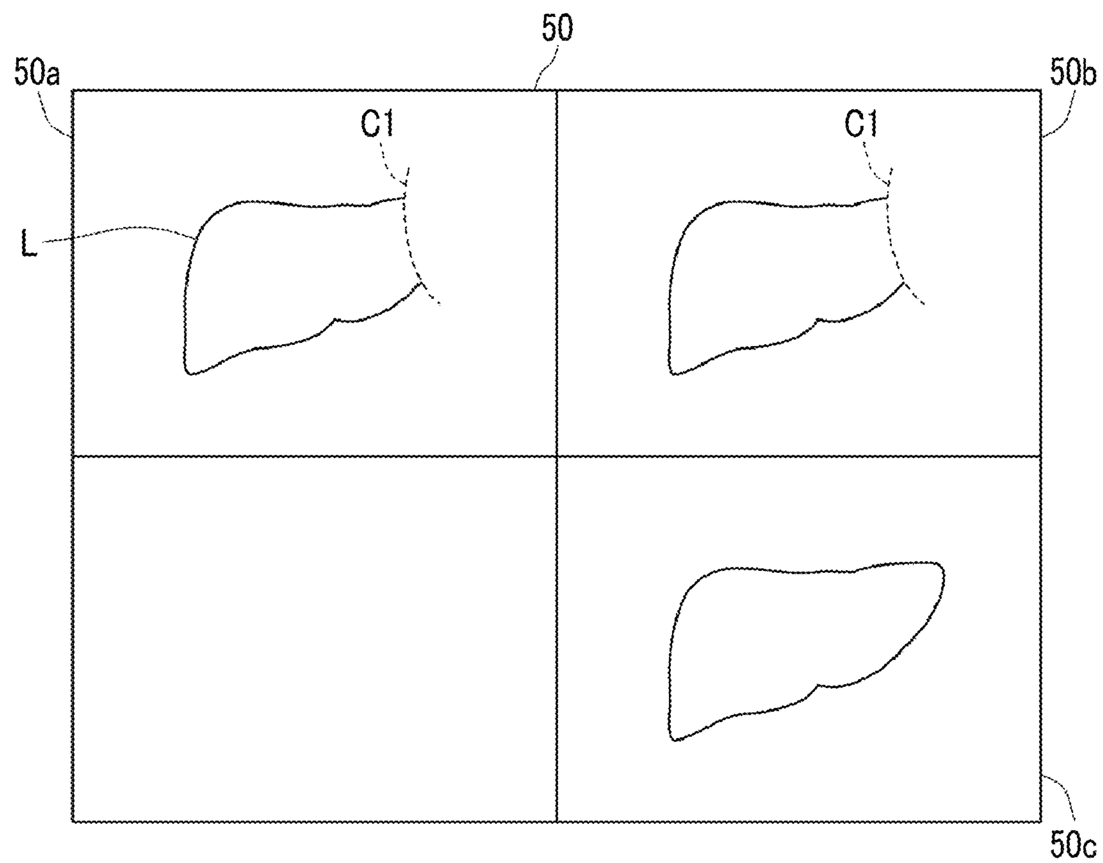
FIG. 11 is a diagram illustrating the display of a virtual image in a case where a part of the liver is resected.

Then, in a case where it is detected that a part (lesion part) of the virtual image of the liver has been resected (S50, YES), the chapter information assignment unit 13 assigns chapter information to the motion picture based on the detection point in time (S52). Specifically, for example, in a case where a part of the liver L displayed in the motion picture display region 50*a* shown in FIG. 10 is resected along a resection line C1, a virtual image corresponding to the frame is specified and is displayed in the virtual image display region 50*b* as shown in FIG. 11. Then, the chapter information assignment unit 13 detects a resected part of the virtual image displayed in the virtual image display region 50*b* by contour detection processing, and assigns chapter information to the motion picture based on the detection point in time. As the chapter information, for example, "C1" is assigned. In this case, the thumbnail generation unit 14 generates a thumbnail of the virtual endoscopic image in which a part of the liver has been resected (S54). Then, the chapter information and the thumbnail are stored in the storage unit 15 together with the motion picture (S56).

Then, in a case in which the user inputs an instruction to end imaging using the input device 4 (S58, YES), the capturing of the motion picture of the liver is ended. On the other hand, in a case where no instruction to end the imaging is input in S58 (S58, NO), the processing from S46 to S56 is repeatedly performed, and the motion picture of the liver is subsequently stored in the storage unit 15.

For example, in a case where the resection of different locations of the liver L is continued, capturing of the motion picture of the liver is continued, and the display control unit 16 displays each frame of the motion picture and the virtual image corresponding to each frame while updating these in conjunction with each other as described above (S46).

Then, the motion picture acquired by the motion picture acquisition unit 12 is stored in the storage unit 15 (S48). On the other hand, similarly to the above, the virtual image updated corresponding to each frame of the motion picture is input to the chapter information assignment unit 13, and the chapter information assignment unit 13 performs processing for detecting the contour of the liver on the input virtual image.

Figure 12:
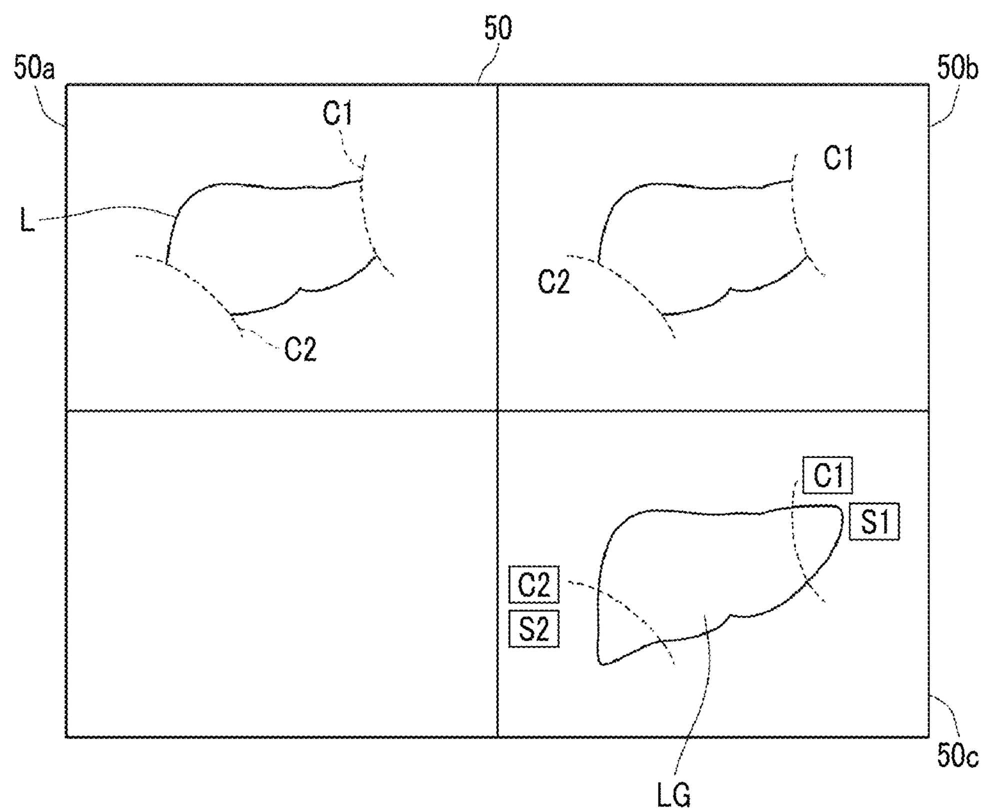
FIG. 12 is a diagram showing an example of a selection screen for receiving the selection of chapter information assigned to the motion picture of the liver.

Then, for example, as shown in FIG. 12, in a case where a part of the liver L is further resected along a resection line C2, a virtual image corresponding to the frame is specified and is displayed in the virtual image display region 50*b* as shown in FIG. 12. Then, in a case where the resected part of the virtual image displayed in the virtual image display region 50*b* is detected by contour detection processing (S50, YES), the chapter information assignment unit 13 assigns chapter information to the motion picture based on the detection point in time (S52). As the chapter information, for example, "C2" is assigned. In this case, the thumbnail generation unit 14 generates a thumbnail of the virtual endoscopic image in which a part of the liver has been resected (S54). Then, the chapter information and the thumbnail are stored in the storage unit 15 together with the motion picture (S56).

Then, in a case in which the user inputs an instruction to end imaging using the input device 4 (S58, YES), the capturing of the motion picture of the liver is ended.

Then, after the chapter information and the thumbnail are stored in the storage unit 15 together with the motion picture, the display control unit 16 displays a selection screen, which is for receiving the selection of one or more pieces of chapter information from a plurality of pieces of chapter information assigned to the motion picture, in the three-dimensional medical image display region 50*c*. FIG. 12 is a diagram showing an example of the selection screen for receiving the selection of chapter information. A three-dimensional medical image LG of the appearance of the liver, characters "C1" and "C2" indicating chapter information, and thumbnails 51 and S2 corresponding to the chapter information are displayed within the selection screen. As shown in FIG. 12, the characters "C1" and "C2" indicating chapter information and the thumbnails 51 and S2 are displayed in the vicinity of the resection line detected at a point in time at which the chapter information is assigned.

Then, in the case of reproducing and displaying the motion picture stored in the storage unit 15, the chapter information "C1" or "C2" is selected by the user on the selection screen. Based on the chapter information selected by the user, the display control unit 16 reproduces the motion picture stored in the storage unit 15 and displays the motion picture on the display device 3. Specifically, a motion picture after the point in time at which the chapter information selected by the user is assigned is reproduced from the storage unit 15, and is displayed on the display device 3.

In the above description, a virtual image is automatically updated by performing matching processing between each frame of the motion picture and the time-series virtual images generated by preliminary simulation. However, the invention is not limited thereto, and the virtual image may be manually updated. Specifically, for example, in a case where a part of the liver is resected, the user may input an instruction to resect the part of the liver of the virtual image using the input device 4 so that the virtual image is updated according to the instruction input. Also in this case, the chapter information assignment unit 13 detects that a part of the virtual image has been resected by contour detection processing, and assigns chapter information to the motion picture based on the detection point in time.

In the above description of the embodiment described, an example in which a video camera is used as the motion picture capturing apparatus 5 has been described. However, for example, an X-ray imaging apparatus for imaging an X-ray fluoroscopic image may be used as the motion picture capturing apparatus 5. For example, in the case of performing catheter treatment of the heart, a motion picture of the chest may be captured using an X-rays imaging apparatus and be stored in the storage unit 15. Also in this case, a virtual image of the X-ray fluoroscopic image of the heart is generated in advance by preliminary simulation. Then, similarly to the above, a virtual image corresponding to each frame of the motion picture is specified and displayed using matching processing or the like. Then, for example, based on the point in time at which it is detected that the catheter has reached the target position of the coronary artery of the heart in the virtual image, chapter information may be assigned to the motion picture.

EXPLANATION OF REFERENCES

1: medical image storage and reproduction apparatus
2: medical image storage server
3: display device
4: input device
5: motion picture capturing apparatus
6: three-dimensional medical image
10: medical image acquisition unit
11: virtual image generation unit
12: motion picture acquisition unit
13: chapter information assignment unit
14: thumbnail generation unit
15: storage unit
16: display control unit
50: window screen
50*a*: motion picture display region
50*b*: virtual image display region
50*c*: three-dimensional medical image display region
60: selection screen
B1, B2, B3: branch
C1: resection line
C2: resection line
G: three-dimensional medical image
L: liver
LG: three-dimensional medical image of liver
S: proximal end of bronchus
S1, S2: thumbnail

What is claimed is:

1. A medical image storage and reproduction apparatus, comprising:

a storage unit that stores a motion picture obtained by continuously capturing a plurality of two-dimensional images while imaging inner portions of an imaging target;

a virtual image generation unit that generates a virtual two-dimensional image representing the inner portions of the imaging target based on a three-dimensional medical image obtained by imaging outside of the imaging target in advance;

a chapter information assignment unit that detects an anatomical feature or a functional feature from the virtual image corresponding to an updated frame according to updating of each frame of the motion picture and assigns chapter information to the motion picture, thereby segmenting the motion picture, based on the detected anatomical feature or the detected functional feature from the virtual image, and based on a detection point in time of the detected anatomical feature or the detected functional feature, wherein the motion picture is segmented by the chapter information which is based on the detected feature and the detection point from the virtual two-dimensional image; and a display control unit that displays a selection screen, which is for receiving selection of one or more pieces of chapter information from a plurality of pieces of chapter information assigned to the motion picture, on a display unit, and the display control unit displays the virtual two-dimensional image with the chapter information on the display unit, wherein the display control unit reproduces the stored motion picture that has been segmented based on the chapter information received on the selection screen, and displays the reproduced motion picture on the display unit.

2. The medical image storage and reproduction apparatus according to claim 1, wherein, in a case where a plurality of pieces of chapter information are selected on the selection screen, the display control unit reproduces the stored motion picture based on an order of selection of the plurality of pieces of chapter information, and displays the reproduced motion picture on the display unit.

3. The medical image storage and reproduction apparatus according to claim 1, wherein the display control unit displays the three-dimensional medical image on the selection screen, and displays the chapter information for the displayed three-dimensional medical image.

4. The medical image storage and reproduction apparatus according to claim 3, wherein the display control unit displays the chapter information for the three-dimensional medical image based on positional information of the anatomical feature or the functional feature on the three-dimensional medical image.

5. The medical image storage and reproduction apparatus according to claim 1, further comprising:

a thumbnail generation unit that generates a thumbnail including at least one of a frame of the motion picture or the virtual image based on a detection point in time of the anatomical feature or the functional feature and stores the thumbnail and the chapter information so as to be associated with each other, wherein the display control unit displays the chapter information and the thumbnail, which is associated with the chapter information, on the selection screen.

6. The medical image storage and reproduction apparatus according to claim 1 wherein the storage unit stores a motion picture obtained by imaging a bronchus as the imaging target with an endoscope, and the virtual image generation unit generates a virtual endoscopic image of an inside of the bronchus as the virtual image.

7. The medical image storage and reproduction apparatus according to claim 6, wherein the display control unit displays a three-dimensional medical image of the bronchus on the selection screen, and displays the plurality of pieces of chapter information for the three-dimensional medical image of the bronchus based on positional information of the anatomical feature or the functional feature on the three-dimensional medical image, and in a case where one of the plurality of pieces of chapter information is selected on the selection screen, chapter information on a shortest path from a proximal end of the bronchus to a position of the selected one piece of chapter information on the three-dimensional medical image is selected, and the stored motion picture from the proximal end of the bronchus to the position of the selected one piece of chapter information on the three-dimensional medical image is reproduced based on the selected chapter information on the shortest path and is displayed on the display unit.

8. The medical image storage and reproduction apparatus according to claim 6, wherein the display control unit displays a three-dimensional medical image of the bronchus on the selection screen, and displays the plurality of pieces of chapter information for the three-dimensional medical image of the bronchus based on positional information of the anatomical feature or the functional feature on the three-dimensional medical image, and in a case where two of the plurality of pieces of chapter information are selected on the selection screen, chapter information on a shortest path from a position of one of the selected two pieces of chapter information on the three-dimensional medical image to a position of the other piece of chapter information on the three-dimensional medical image is selected, and the stored motion picture from the position of the one piece of chapter information on the three-dimensional medical image to the position of the other piece of chapter information on the three-dimensional medical image is reproduced based on the selected chapter information on the shortest path and is displayed on the display unit.

9. The medical image storage and reproduction apparatus according to claim 6, wherein the chapter information assignment unit detects a branch of the bronchus from the virtual endoscopic image as the anatomical feature.

10. The medical image storage and reproduction apparatus according to claim 1, wherein the storage unit stores a motion picture obtained by imaging a liver as the imaging target, and the virtual image generation unit generates a virtual image of the liver.

11. The medical image storage and reproduction apparatus according to claim 10, wherein the chapter information assignment unit detects a resected part of the liver from a virtual image of the liver as the anatomical feature.

12. The medical image storage and reproduction apparatus according to claim 1, wherein the display control unit displays each frame of the motion picture and a virtual image corresponding to each frame on the display unit side by side.

13. A medical image storage and reproduction apparatus, comprising:

a storage unit that stores a motion picture obtained by continuously capturing a plurality of two-dimensional images while imaging inner portions of a bronchus with an endoscope;

a virtual image generation unit that generates a virtual two-dimensional endoscopic image representing the inner portions of the bronchus based on a three-dimensional medical image obtained by imaging outside of the bronchus in advance;

a chapter information assignment unit that detects a branch of the bronchus from the virtual endoscopic image and assigns chapter information to the motion picture, thereby segmenting the motion picture, based on the detected branch of the bronchus from the virtual image, and based on a detection point in time of the detected branch of the bronchus, wherein the motion picture is segmented by the chapter information which is based on the detected branch of the bronchus and the detection point from the virtual two-dimensional endoscopic image; and a display control unit that displays a selection screen, which is for receiving selection of one or more pieces of chapter information from a plurality of pieces of chapter information, on a display unit by displaying the plurality of pieces of chapter information assigned to the motion picture for the three-dimensional medical image based on positional information of a branch of the bronchus on the three-dimensional medical image and the display control unit displays the virtual two-dimensional image with the chapter information on the display unit, wherein the display control unit reproduces the stored motion picture that has been segmented based on the chapter information received on the selection screen, and displays the reproduced motion picture on the display unit.

14. A medical image storage and reproduction method for storing a motion picture obtained by continuously capturing a plurality of two-dimensional images while imaging inner portions of an imaging target and reproducing the stored motion picture, comprising:

generating a virtual two-dimensional image representing the inner portions of the imaging target based on a three-dimensional medical image obtained by imaging outside of the imaging target in advance;

detecting an anatomical feature or a functional feature from the virtual image corresponding to an updated frame according to updating of each frame of the motion picture and assigning chapter information to the motion picture, thereby segmenting the motion picture, based on the detected anatomical feature or the detected functional feature from the virtual image, and based on a detection point in time of the detected anatomical feature or the detected functional feature, wherein the motion picture is segmented by the chapter information which is based on the detected feature and the detection point from the virtual two-dimensional image;

displaying a selection screen, which is for receiving selection of one or more pieces of chapter information from a plurality of pieces of chapter information assigned to the motion picture, on a display unit, and displaying the virtual two-dimensional image with the chapter information on the display unit; and reproducing the stored motion picture that has been segmented based on the chapter information received on the selection screen and displaying the reproduced motion picture on the display unit.

15. A non-transitory computer readable medium storing a program that causes a computer to execute a process for storing a motion picture obtained by continuously capturing a plurality of two-dimensional images while imaging inner portions of an imaging target and reproducing the stored motion picture, the process comprising:

generating a virtual two-dimensional image representing the inner portions of the imaging target based on a three-dimensional medical image obtained by imaging outside of the imaging target in advance;

detecting an anatomical feature or a functional feature from the virtual image corresponding to an updated frame according to updating of each frame of the motion picture and assigning chapter information to the motion picture, thereby segmenting the motion picture, based on the detected anatomical feature or the detected functional feature from the virtual image, and based on a detection point in time of the detected anatomical feature or the detected functional feature, wherein the motion picture is segmented by the chapter information which is based on the detected feature and the detection point from the virtual two-dimensional image;

displaying a selection screen, which is for receiving selection of one or more pieces of chapter information from a plurality of pieces of chapter information assigned to the motion picture, on a display unit, and displaying the virtual two-dimensional image with the chapter information on the display unit; and reproducing the stored motion picture that has been segmented based on the chapter information received on the selection screen and displaying the reproduced motion picture on the display unit.

* * * * *